Figure 1:
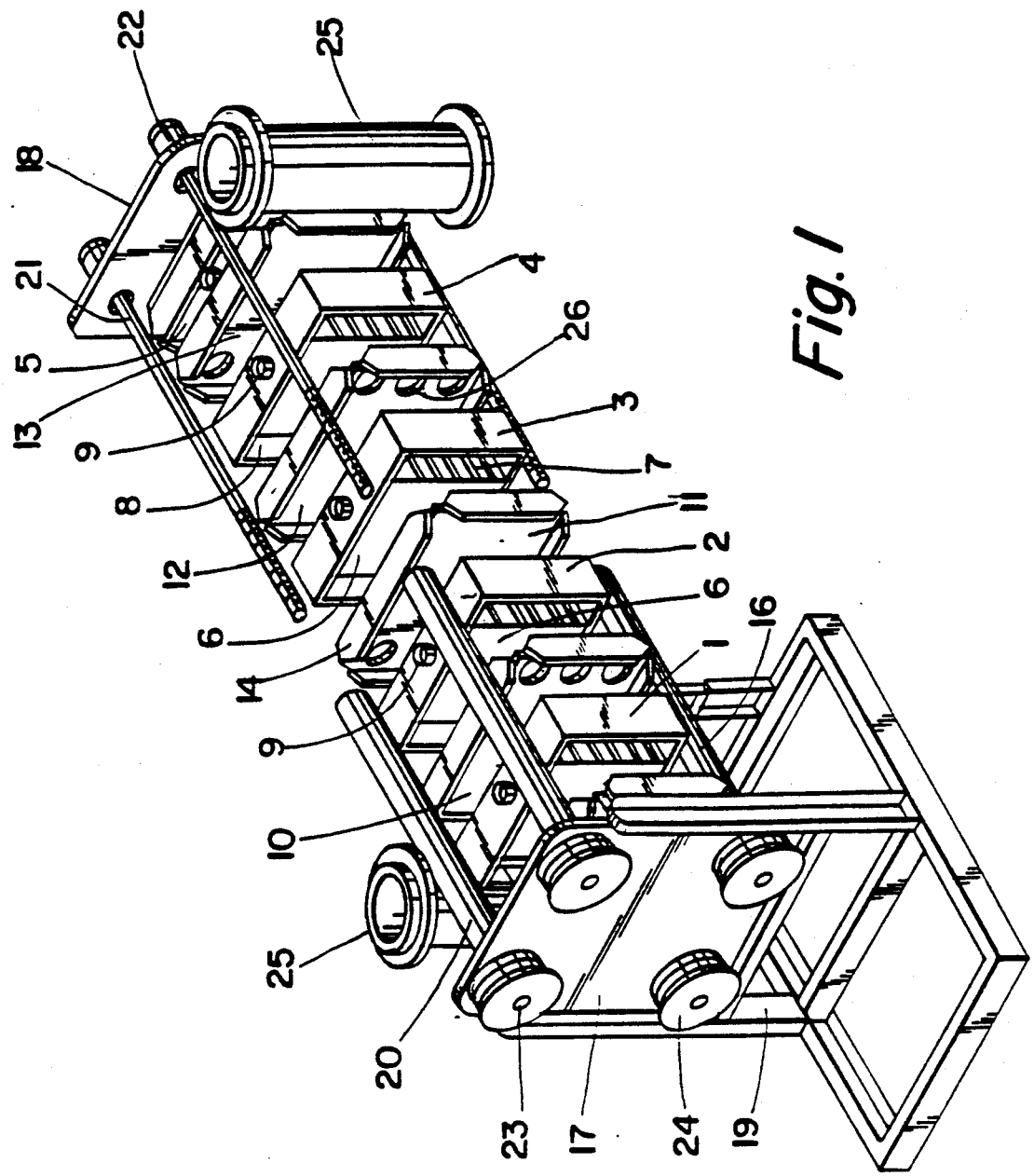

United States Patent [19]

Møller

[11] Patent Number: 5,084,220
[45] Date of Patent: Jan. 28, 1992

[54] MEMBRANE FILTRATION APPARATUS AND METHOD OF MAKING A MEMBRANE FILTRATION UNIT

[75] Inventor: Jens K. Møller, Maribo, Denmark

[73] Assignee: Dow Danmark A/S, Copenhagen, Denmark

[21] Appl. No.: 672,212

[22] Filed: Mar. 19, 1991

Related U.S. Application Data

[62] Division of Ser. No. 476,463, filed as PCT/DK88/00204, Dec. 6, 1988.

[30] Foreign Application Priority Data

Dec. 7, 1987 [DK] Denmark .............................. 6418/87
Oct. 18, 1988 [DK] Denmark .............................. 5803/88

[51] Int. Cl.⁵ ...................... B01D 67/00; B01D 69/00
[52] U.S. Cl. ............................ 264/45.1; 264/DIG. 48; 264/DIG. 62
[58] Field of Search ................ 264/41, 45.1, DIG. 48, 264/DIG. 62

[56] References Cited

U.S. PATENT DOCUMENTS 3,793,111 2/1974 Judkins .
3,943,057 3/1976 Jamet et al. .
4,430,218 7/1984 Perl et al. .

FOREIGN PATENT DOCUMENTS

3337/80 11/1980 Denmark .
0066198 5/1982 European Pat. Off. .
0106933 10/1982 European Pat. Off. .
2213150 9/1972 Fed. Rep. of Germany .
2933034 3/1981 Fed. Rep. of Germany .
3127548 4/1982 Fed. Rep. of Germany .
3231251 3/1983 Fed. Rep. of Germany .
3317517 3/1985 Fed. Rep. of Germany .
3505792 8/1985 Fed. Rep. of Germany .
3505420 8/1986 Fed. Rep. of Germany .
1248509 11/1959 France .
133575 2/1972 Norway .
447543 11/1986 Sweden .
1268397 3/1972 United Kingdom .
2192812A 1/1988 United Kingdom .

Primary Examiner—Frank Sever

[57] ABSTRACT

In the method of making a filtration unit, envelope-shaped membrane units (62) are placed in a stack, a curable liquid binder (101) is introduced between the membrane units from at least one surface of the filtration unit to a predetermined depth (a), and upon curing of the binder a layer of the binder together with the marginal portions of the edges of the membrane units embedded therein is removed, such as by surface cutting or machining, up to a depth (b) smaller than the depth (a).

10 Claims, 14 Drawing Sheets

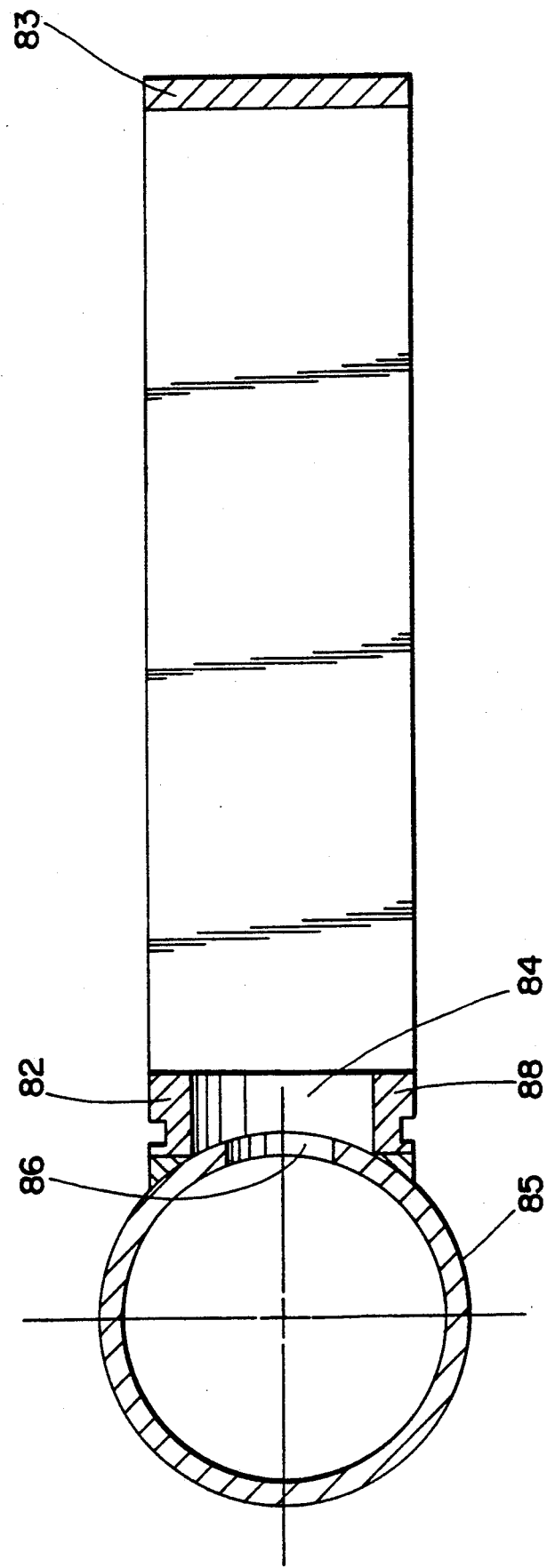

MEMBRANE FILTRATION APPARATUS AND METHOD OF MAKING A MEMBRANE FILTRATION UNIT

CROSS-REFERENCE TO RELATED APPLICATION

This is a divisional of application Ser. No. 476,463, filed as PCT/DK88/00204, Dec. 6, 1988, pending.

The invention relates to an apparatus for separating a liquid into two fractions by membrane filtration. The liquid to be treated will in the following be referred to as the feed liquid, the liquid that has penetrated through the membranes as permeate, and the liquid that has not penetrated through the membranes as concentrate.

The apparatus is of the kind comprising a plurality of separate, exchangeable filtration units, each consisting of a stack of membranes in which two discrete systems of flow passages are provided for conducting liquids along opposite surfaces of each membrane, viz. a first system for conducting feed liquid or concentrate, and a second system for conducting permeate.

An apparatus of this kind is known, which consists of a tubular pressure container, in which a series of adjacent filtration units are arranged in the form of stacks constructed as mentioned above.

The feed liquid is supplied to one end of the tubular pressure container and is caused to flow along the outer side of the filtration units towards the other end of the pressure container, where the flow of liquid makes a turn of 180° and is forced to flow back towards the first mentioned end of the pressure container through the said first system of flow passages of the filtration units in serial succession.

The liquid is discharged as concentrate fraction at the same end as that at which the supply takes place The permeate is collected in tubes arranged perpendicularly to the membranes of each filtration unit, and the end of these tubes are connected to a discharge conduit which is arranged parallel to the axis of the pressure container and serves to discharge the permeate fraction.

When using the above mentioned known apparatus it will be necessary in case of a membrane breakdown to disassemble the apparatus completely, which is a work and time consuming operation, because it is necessary to withdraw all filtration units from the pressure container for examination.

Moreover, the known apparatus is not suitable for use where a great capacity is needed.

In ultra filtration it has hitherto been customary to use filtration modules with a membrane area of up to 60 m$^2$/module. There is, however, particularly in the production of drinking water from surface water—a need to employ modules having a membrane area of up to 5,000 m$^2$/module. In order to satisfy this need, the membrane size must be increased, and it is therefore desirable to use membranes having an area of up to 1×1 m and an apparatus comprising a high number of filtration units.

This is not practically possible in the known apparatus described above. Moreover, it is not possible in the known apparatus to combine a series flow with a parallel flow.

It is the object of the invention to eliminate or reduce the above mentioned drawbacks of the known apparatus.

To achieve this object and other objects, which will be apparent from the following description, the apparatus according to the invention is characterized in that it comprises an array of cassettes arranged side by side and separated from each other by intermediate plates, each cassette comprising a cassette frame and a filtration unit of the kind referred to arranged therein in such a manner that the flow passages of said first system are open towards two free zones within the cassette frame, while the flow passages of said second system at least at one end are open and communicate with means for the separate discharge of permeate from each filtration unit, the apparatus further comprising means for supplying feed liquid to a free zone of at least one cassette frame, means for discharging concentrate from a free zone of at least one cassette frame, passage openings being provided, as required, in the intermediate plates for interconnecting free zones of adjoining cassette frames, means for supporting the array of cassettes and intermediate plates, and means for clamping this array together so as to engage the cassette frames sealingly against the intermediate plates along for loosening said array so as to permit the individual removal of any selected cassette.

By surveying the means for the separate discharge of permeate from the individual filtration units and thereby the individual cassettes, membrane defects and breakdowns can readily be localized. Thus. membrane defects or breakdowns will typically have the effect that non-treated or only partially treated liquid is mixed with the permeate and that the latter thereby changes colour.

In such cases, defects or breakdowns can easily be localized by using discharge means in the form of transparent tubes.

After a membrane defect or breakdown has been localized and the supply of feed liquid has been stopped, the apparatus can readily and quickly be separated by relieving the clamping pressure on the array of cassettes and intermediate plates and pushing the plates adjacent to the cassette containing the defective filtration unit aside from that cassette. Thereafter the cassette can be set free and removed, whereafter the defective filtration unit in the cassette can be replaced by a new one, or an entirely new cassette can be inserted.

After a cassette with a new filtration unit has been placed in position in the apparatus, the clamping pressure is again applied. whereafter the apparatus will be fully operative.

It is an important feature of the invention that its tightness is secured by the urging of the cassettes against the adjacent plates.

In a preferred embodiment of the invention, each intermediate plate is constructed with a reinforcement frame which runs along the periphery of the plate and protrudes from both sides of the plate and has a shape and size such that the frame portions protruding from the plate partly overlap the adjacent cassette frame and serve as a tension relieving support for that cassette frame when the latter sealingly engages the plate. Thereby the cassettes become capable of resisting high inner pressures.

While reinforcement frames fitting closely around the cassettes may be used it is preferred in practice to construct the cassette frames and the reinforcement frames in such a manner as to leave an interspace, in which wedges are inserted.

The array of cassettes and plates may advantageously be supported by two parallel supporting rods which are mounted in end plates. Where reinforcement frames are provided, only these will be directly supported on the rods.

Advantageously, the apparatus may further comprise two rods which are disposed parallel to the supporting rods and are likewise mounted in the end plates, all four rods being hollow and each containing a spindle co-operating with a nut arranged on the outer side of one end plate and serving to clamp the end plates against the array of cassettes and plates.

Preferably each nut is fixedly connected with a sprocket, and all four sprockets are coupled together by means of a chain so that they can be rotated synchronously by means of a common driving motor.

Preferably, the cassette frames are of rectangular configuration, and the filtration units are arranged in the middle portion of the cassette frames, while the free zones are located at the ends of the cassette frames.

In an advantageous embodiment of the apparatus according to the invention a chamber for the collection of permeate is provided on top of each filtration unit.

Whether the said free zones constitute an entrance zone for the supply of feed liquid to the filtration unit or a collection zone for concentrate depends on the direction of flow in each individual cassette.

This direction of flow is determined by the construction of the plates provided between the cassettes. If passage openings are provided at both ends of all plates, the liquid supplied to the apparatus will distribute itself to all free zones at the supply side, along parallel flow in a direction towards the opposite side of the apparatus will be obtained. The free zones at the latter side of the apparatus will therefore serve as a common collecting zone for concentrate.

If alternating plates have passage openings at opposite sides of the apparatus, liquid which is supplied to a zone at one end of the apparatus will be forced to flow in series through all filtration units until it has reached the opposite end of the apparatus. In practice, it is preferred to employ a combined parallel/series flow in the whole length of the apparatus or parts thereof.

If it is only desired to use part of the apparatus for the separation of a liquid, a plate without passage openings is placed against the last cassette in the part of the apparatus which it is desired to utilize.

A plate without holes is likewise used for delimiting the liquid flow at the ends of the apparatus.

By a suitable composition of cassettes with and without means for feed liquid supply/collection of concentrate and a suitable arrangement of intermediate plates without holes, with holes at one end or with holes at both ends, it is possible in a simple manner to obtain patterns of flow fulfilling widely varying needs.

Advantageously, the membranes of the stack constituting the filtration unit may be provided in the form of pairs of membranes, and the two membranes of each pair may be spaced by means of a spacing element to permit the permeate to flow from the interior of the filtration unit towards the permeate collecting chamber without great resistance. It has been found particularly advantageous to use spacing elements in the form of a net or web of synthetic yarn, e.g. yarn formed by monofilaments of polypropylene.

A knitted net or web has been found more suitable than a woven net or web, because the former is less flat than a woven net or web and consequently exerts a lower resistance to the flow of liquid. A particularly suitable net or web is a knitted net or web that has been biaxially stretched in connection with a heat treatment such a treatment increasing the stiffness of the net or web.

Where the membranes are provided in the form of pairs as described, spacing elements may suitably be inserted between mutually facing membranes of each two successive pairs, which spacing elements preferably consist of an extruded net or web.

In a particularly preferred embodiment, the stack of membranes is so arranged that the membranes are disposed in planes perpendicular to the longitudinal axis of the apparatus, and the stack is enclosed between two end plates.

Thereby the two non-covered sides of the stack will adjoin the free zone for the supply of liquid to the flow passages, and the free zone for the collection of concentrate, respectively.

For supporting the stack, cross ribs may be provided on the two non-covered sides of the stack, the ends of said ribs being received in corresponding slots in the edges of the end plates.

The above mentioned permeate collecting chamber is preferably located on top of the stack, and in that case a bottom plate will be arranged on the underside of the stack, which bottom plate is connected to the end plates.

In the permeate collecting chamber cross ribs may likewise be provided for supporting the stack.

Preferably the filtration unit constituted by the said stack with end plates, bottom plates, and permeate collecting chamber with permeate outlet is loosely arranged in the cassette frame so that it may readily and quickly be taken out and replaced by a new unit in the case of membrane breakdowns or defects.

The invention also relates to a method of making a filtration unit comprising a stack of membranes, in which two discrete systems of flow passages are provided for conducting liquids along opposite surfaces of each membrane, viz. a first system for conducting feed liquid or concentrate and a second system for conducting permeate The method according to the invention is characterized by the following steps:

(a) building up a stack of envelope-shaped membrane units, (b) introducing a curable liquid binder between adjacent membrane units from the edges thereof in an area extending across the whole length and width of a surface of the stack up to a predetermined distance from said surface, (c) causing or leaving the binder thus introduced to cure, and (d) removing the cured binder and the marginal portions of the membranes up to a depth smaller than said predetermined distance.

By the described removal of material from the surface of the stack, the marginal zones of the envelope-shaped membrane units will be removed, whereby a free outlet opening from each membrane unit is formed in the full length of the membrane unit, whereby the resistance to the flow of permeate out of the unit is reduced to a minimum. Owing to the limited depth to which material is removed, no passage is formed to the free spaces between the membrane units. When the filtration unit is placed in a filtration housing, e.g. a cassette of the kind described above, having an inlet chamber for feed liquid or concentrate and an outlet chamber for permeate, a reliable isolation of these from one another can therefore be obtained without any need of providing special sealing means.

It is a further advantage of the invention that it is possible, without appreciable production problems, to place a spacing element, e.g. in the form of a net or web between opposite sides of a membrane unit, and likewise, if desired, spacing elements, e.g. in the form of a relatively coarse net or web, may be placed in the interspaces between adjacent membrane units.

Preferably membrane units are employed in which both sides consist of a non-woven fabric, e.g. composite fibers comprising a core of polypropylene enclosed in polyethylene on which a thin coating layer of the membrane material i.e. in the form of a polysulfone is deposited.

The above mentioned spacing elements, i.e. both those serving to keep the two membrane sides apart, and those keeping adjacent membrane units apart, need not consist of separate elements, but may be constituted by portions integral with the membranes.

The membranes can as an example be produced by the deposition of a membrane layer, e.g. consisting of polysylfone or polyvinylidene fluoride on a uniaxially profiled substrate, e.g. in the form of a knitted web, which is placed on the inner faces of the envelope-shaped membrane unit, thereby facilitating the flow of permeate towards the permeate outlet. If desired, a separate net or web may be additionally provided as a spacing element in each membrane unit.

In another preferred embodiment membrane units are used which are formed by the deposition of a membrane layer on a strong biaxially profiled substrate, e.g. in the form of a coarse net. Hereby it is possible to obtain membranes which are profiled on both sides. By using such membranes, flow promoting passage systems are formed both in the inter or of the membrane unit and in the interspaces between adjacent membrane units.

The passage system in the said interspaces (the concentrate passages) formed under the influence of the operating pressure in the concentrate urging the membrane layers into the mesh areas of the substrate.

In a further embodiment membrane units are used, which consist of a membrane layer moulded onto a uniaxially profiled substrate, to the rear side of which a coarse network is fastened, e.g. by welding. The network ensures that the sides of the membrane unit are kept apart, because the operating pressure will cause the membrane layers to be deformed in the areas corresponding to the meshes of the coarse network, and the uniaxially profiled substrate ensures the formation of a passage system for permeate.

Instead of using a net fastened to the rear side of the membrane substrate, a thin profiled and perforated plate may be used. The fastening of such a plate may e.g. be obtained by spot welding.

Such a system has a relatively great strength and rigidity and is capable of resisting relatively great shearing forces. The said plate may be unit or biaxially profiled.

By selecting suitable separate spacing elements and-/or integral spacing elements, desired main flow directions can be obtained on both the concentrate and the permeate side. It is preferred to use spacing elements which ensure that the main direction of flow on the concentrate side is perpendicular to the main direction of flow on the permeate side, and that the flow on the permeate side is guided directly towards the outlet opening/openings of each membrane unit.

The envelope-shaped membrane units are preferably produced by placing a membrane sheet, e.g. of rectangular shape, on top of another one and uniting the sheets along all four edges by welding or glueing, a separating element being sandwiched between the membrane layers, if desired, before the welding or glueing.

After a surface treatment, if required, of the areas, which later come into contact with the curable binder, for the purpose of improving the adhesion of the binder to the membrane units, a stack of membrane units and spacing elements, if any, is built up and a curable binder is introduced into the interspaces between the membrane units, at least at one and, if desired, two opposite surfaces of the stack.

The curable binder used for this purpose is preferably a polyurethane, but also other materials, such as epoxy resin, capable of establishing a binding between the membrane units and being resistant under the conditions prevailing in the operation of a membrane filtration apparatus, may be considered.

After the binder has been cured, the marginal portions of the membrane units, and any spacing elements provided therebetween, as well as binder are removed from the surface or surfaces where the binder was previously introduced into the interspaces between the membrane units. The removal of material is stopped when the desired openings have been formed along the edges of the membrane units so that the remaining portions of the joint formed by the binder are not affected.

The method according to the invention is particularly suitable for producing filtration units for use in filtration apparatus of the construction set forth above, but the units produced by the method may also be used in other membrane filtration apparatus, in which the same pattern of flow passages is desired.

Figure 2:
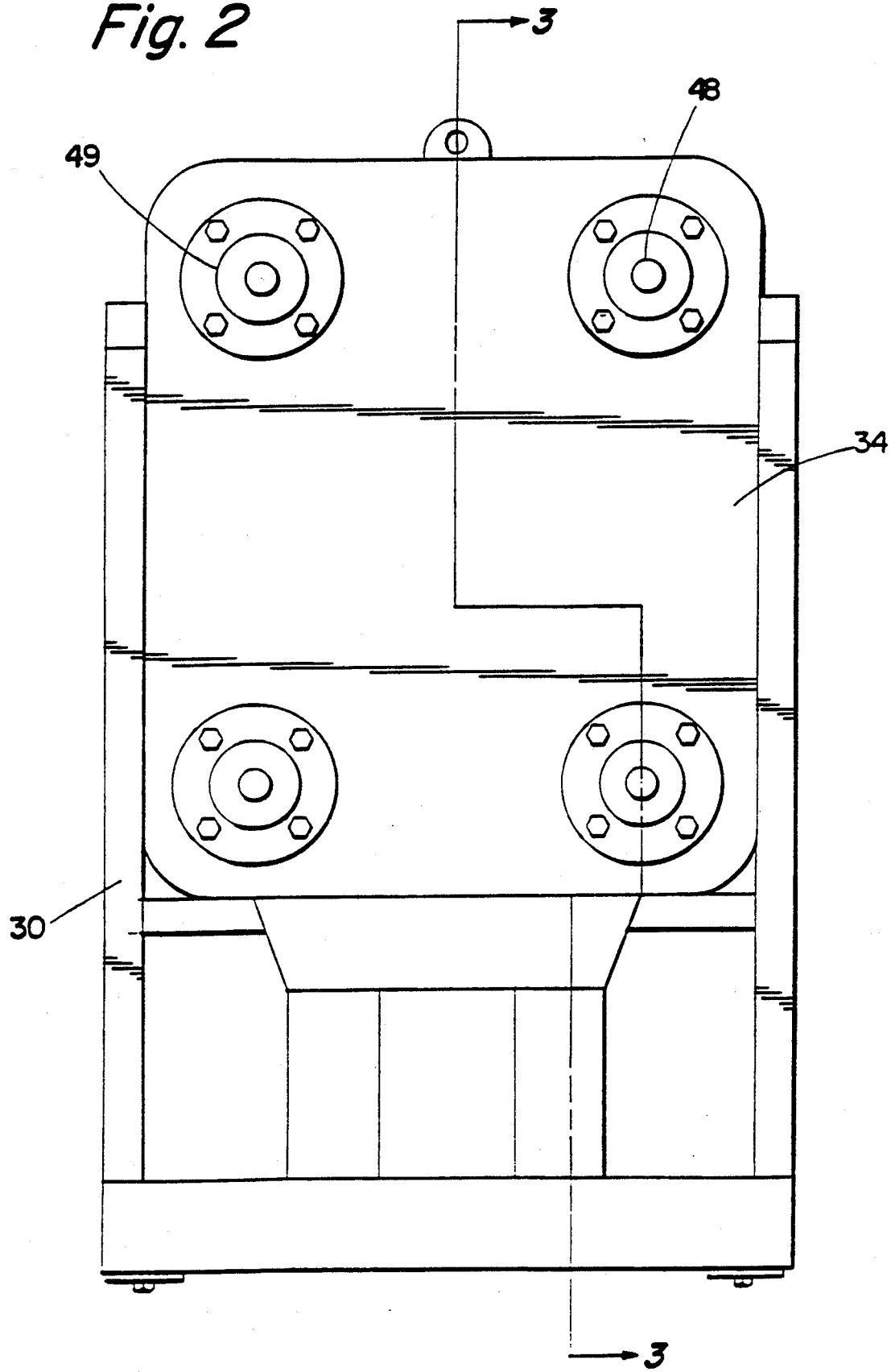
Figure 3:
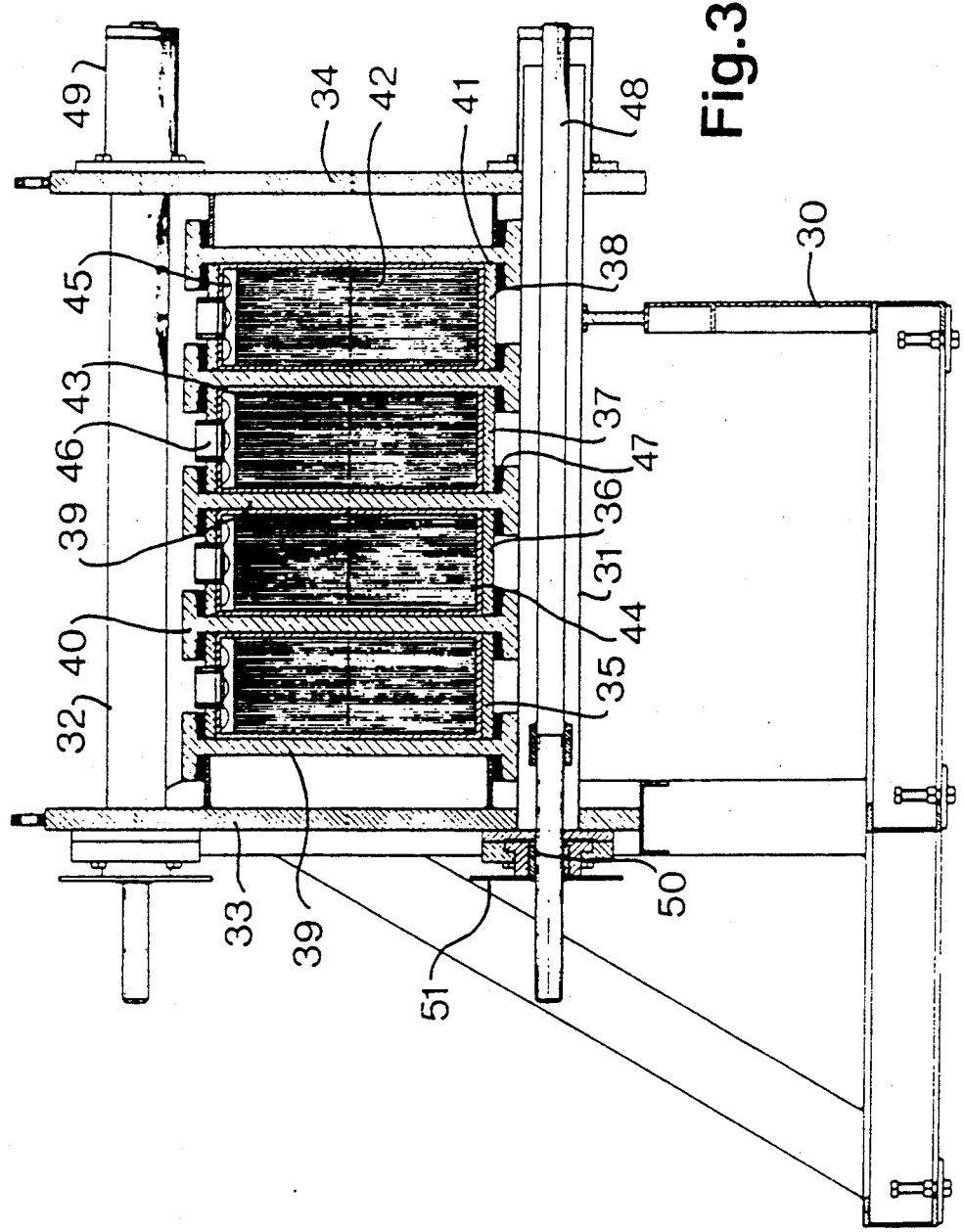

The invention will now be further described with reference to the accompanying drawings, in which FIG. 1 is an exploded view of an apparatus according to a preferred embodiment of the invention, FIG. 2 is an end view of an apparatus according to another embodiment of the invention, FIG. 3 is a cross-section along the line III—III in FIG. 2.

Figure 4:
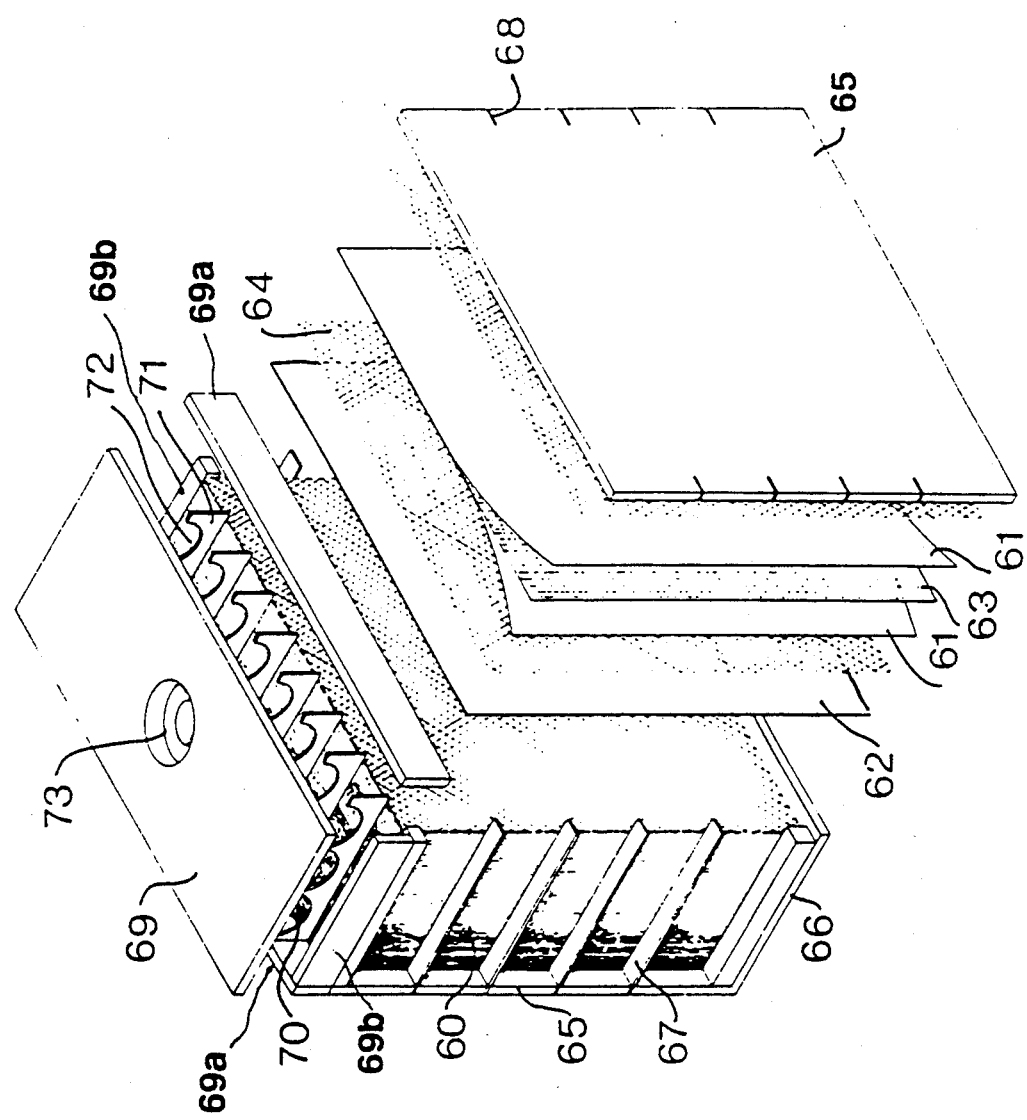
Figure 5:
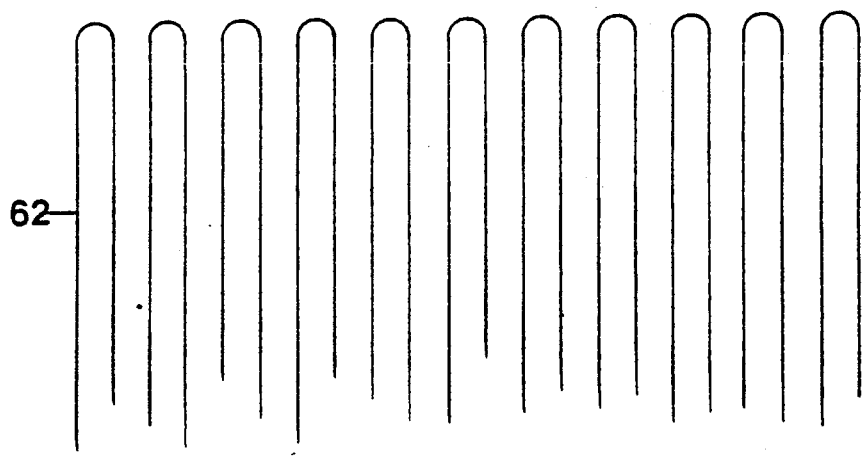
Figure 6:
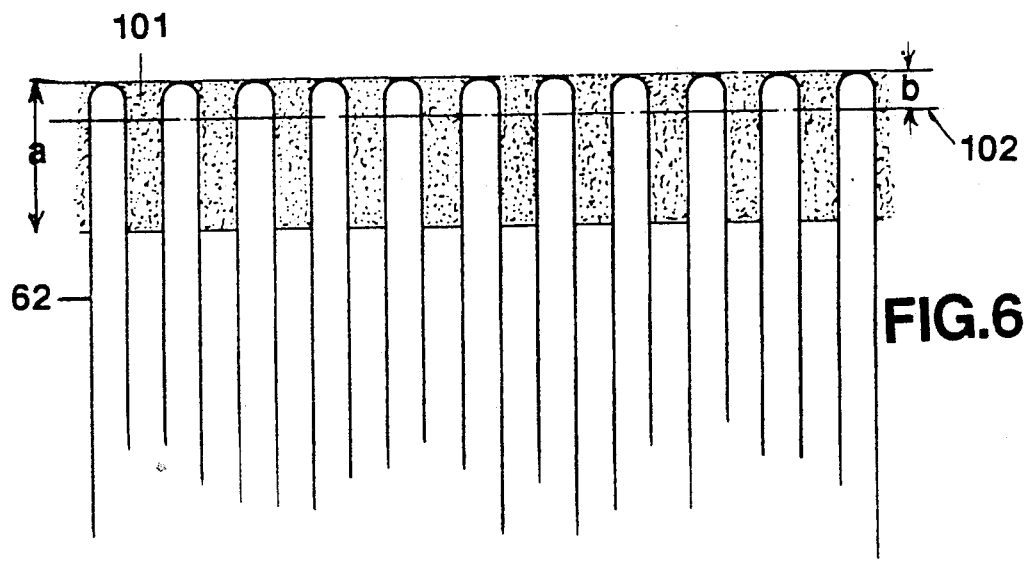
Figure 7:
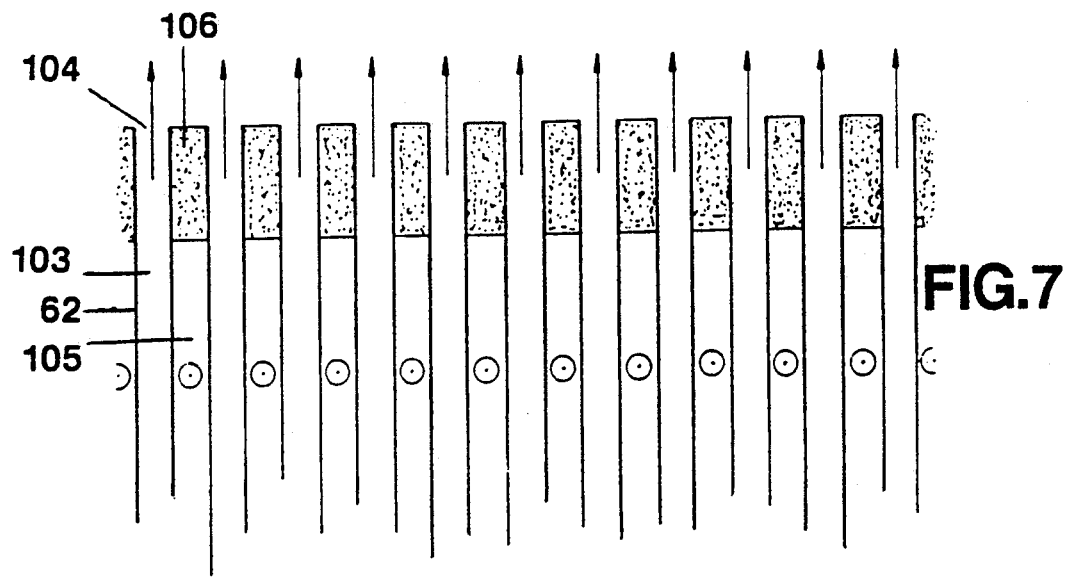
Figure 8:
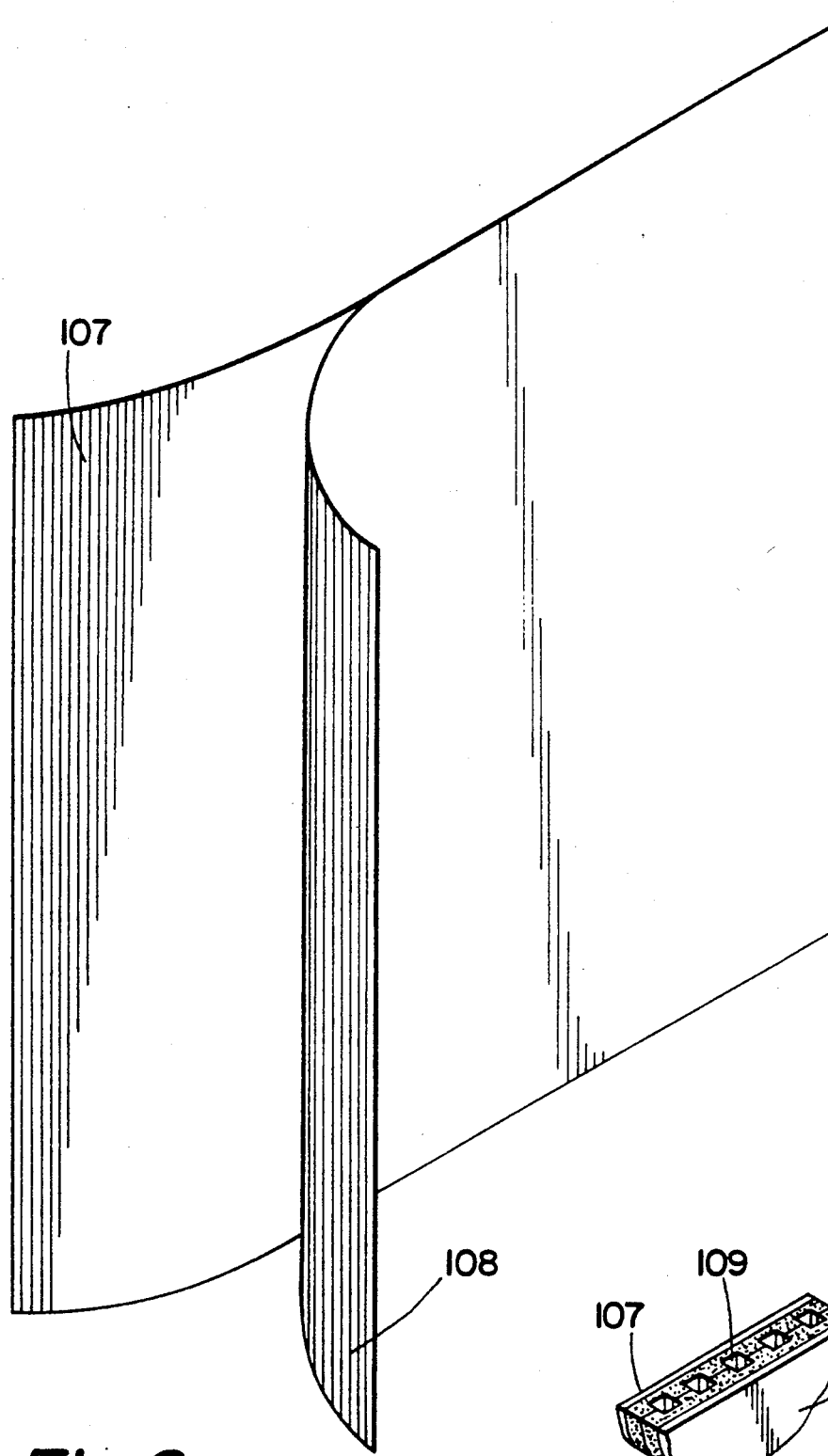
Figure 8A:
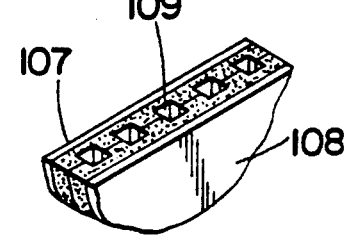
Figure 9:
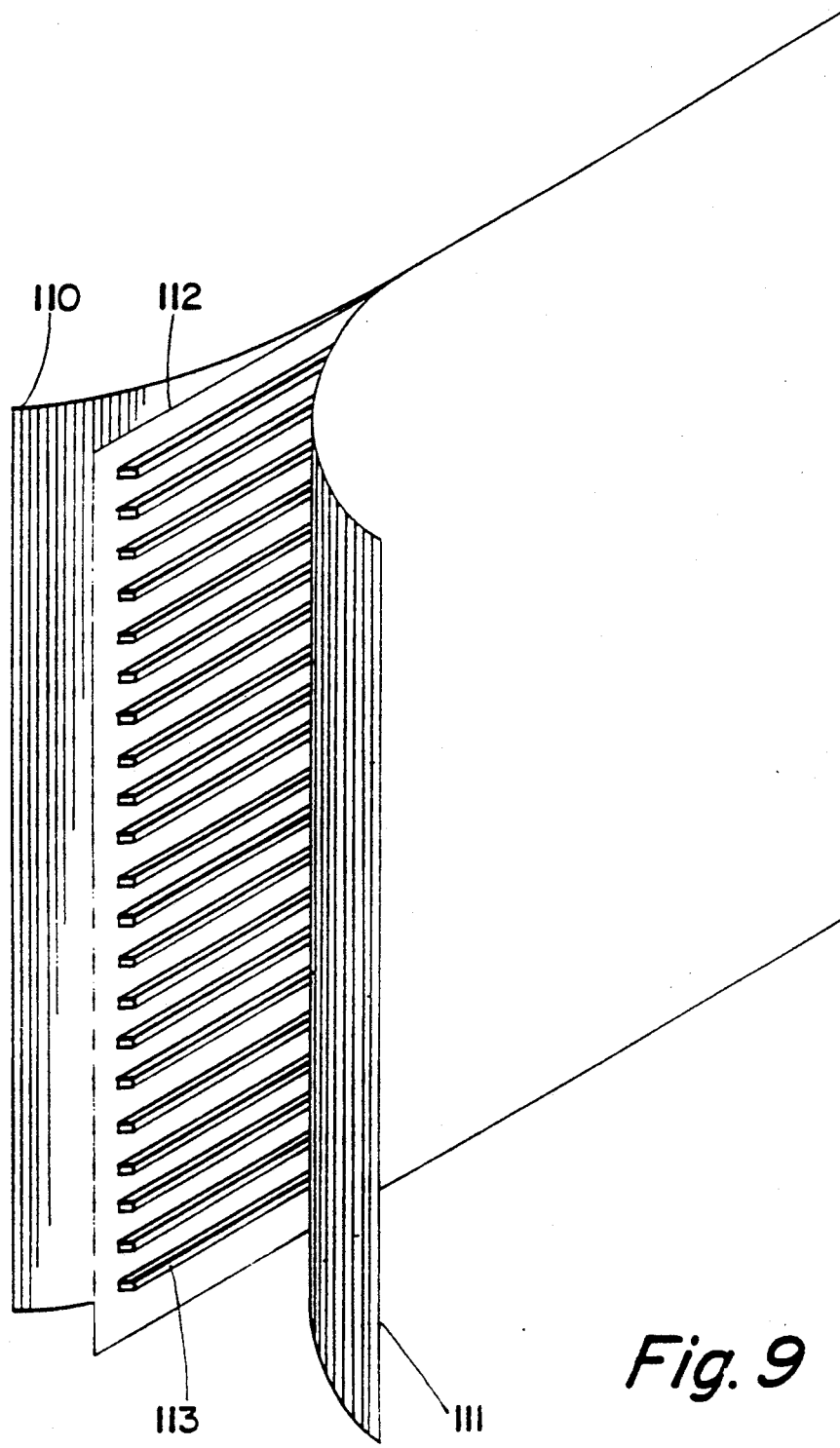
Figure 10:
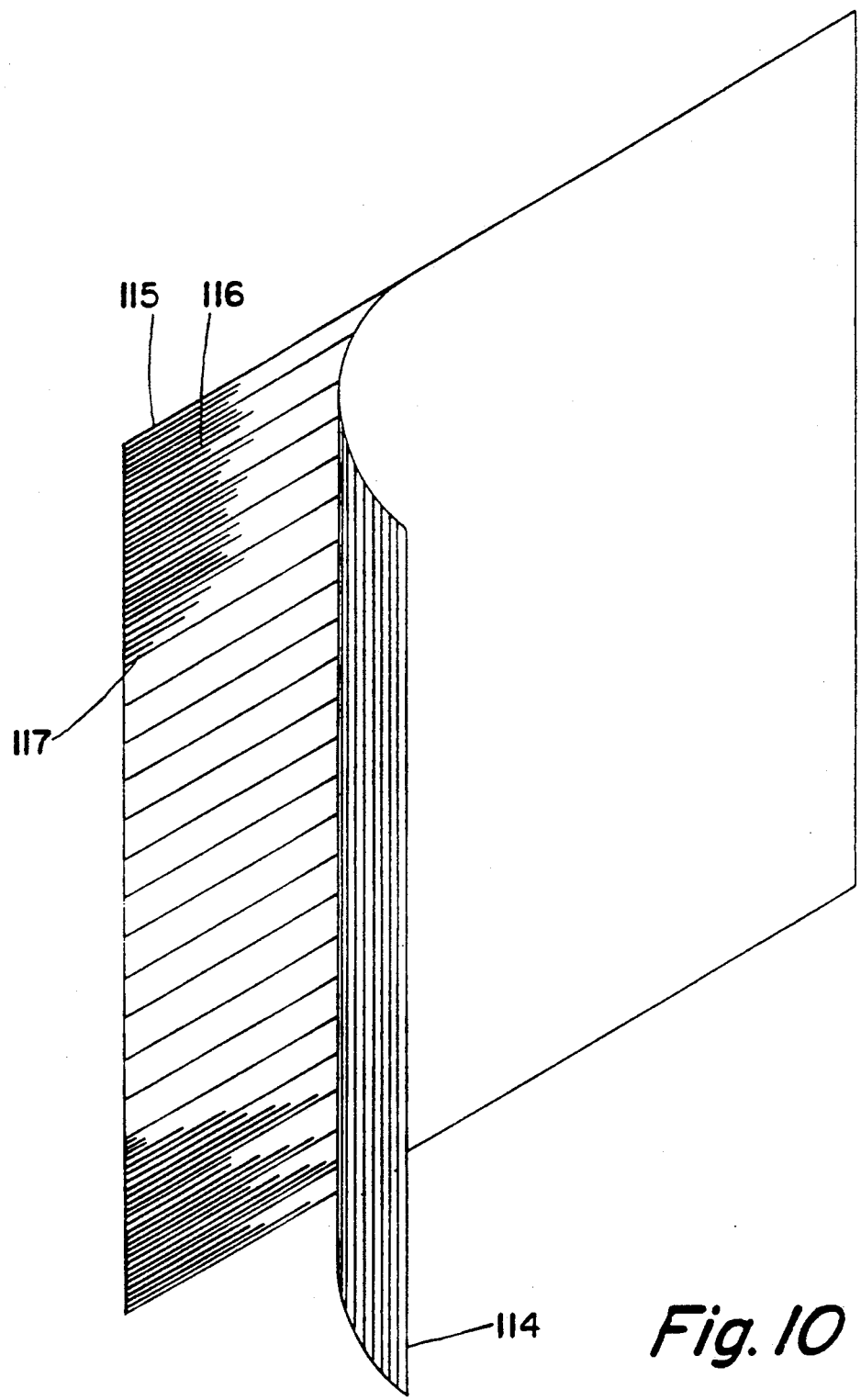
Figure 11:
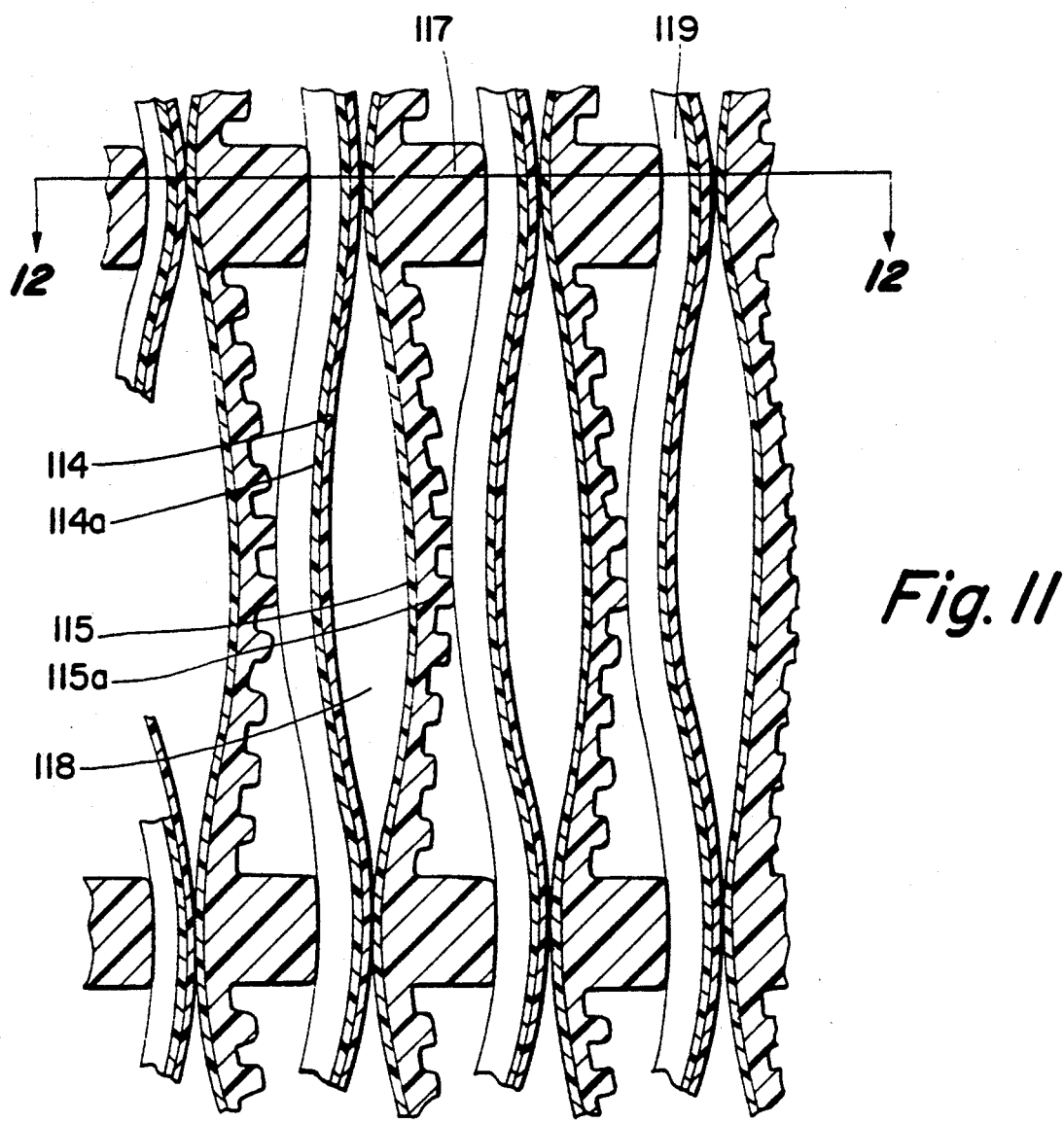
Figure 12:
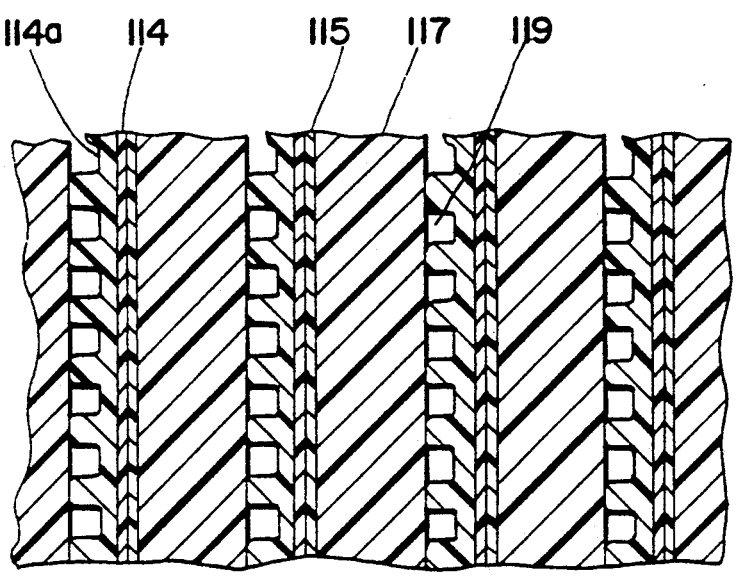
Figure 13:
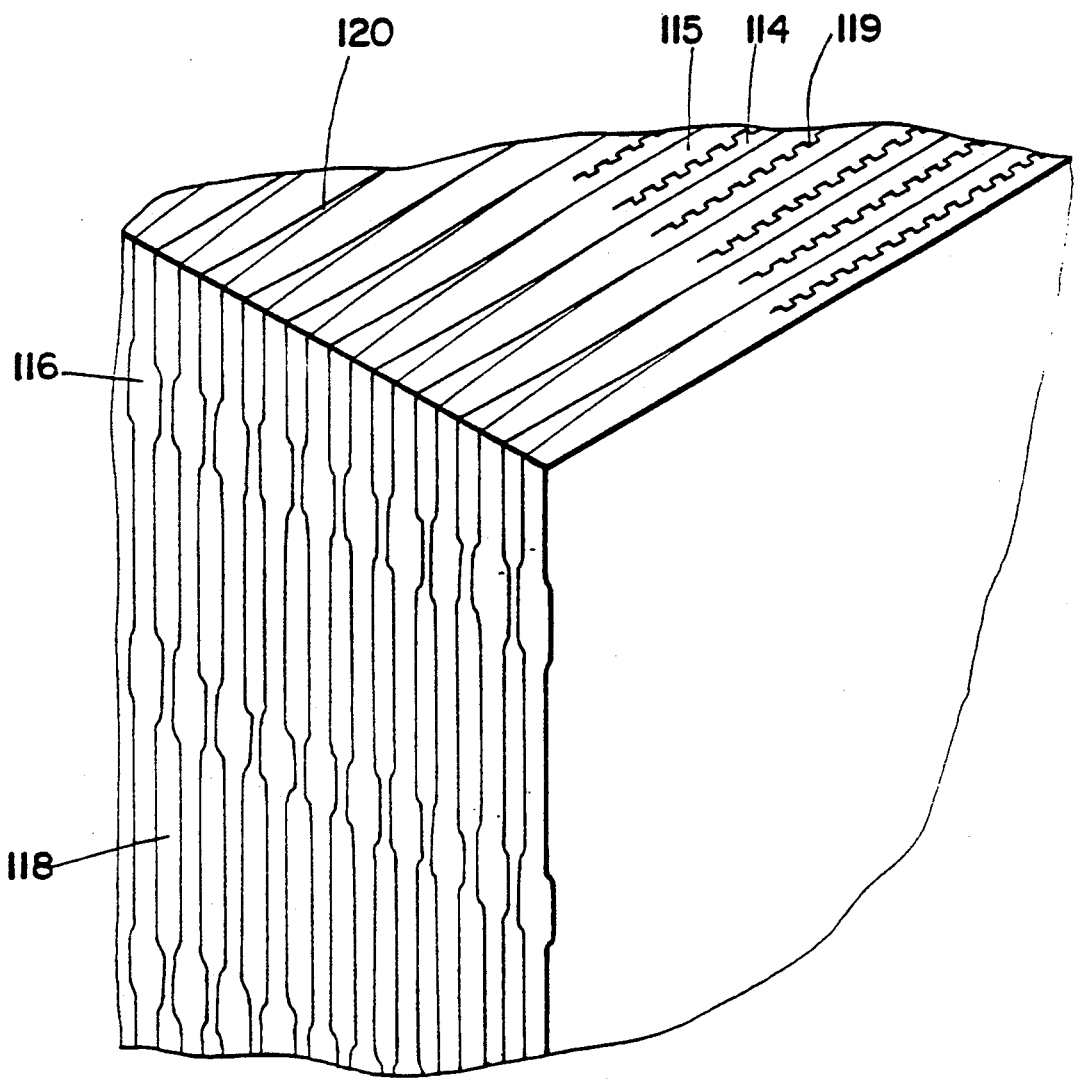
Figure 14:
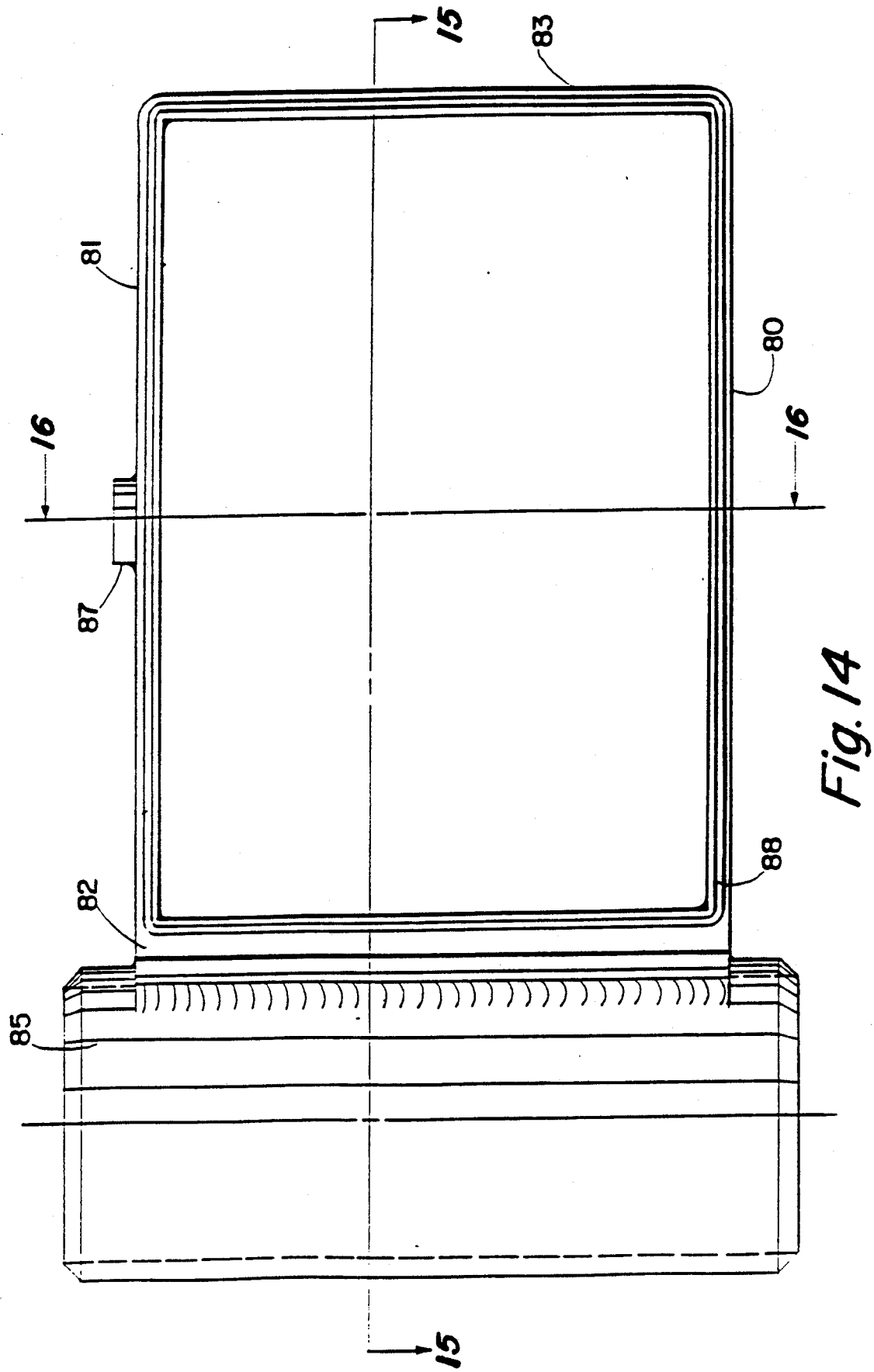
Figure 18:
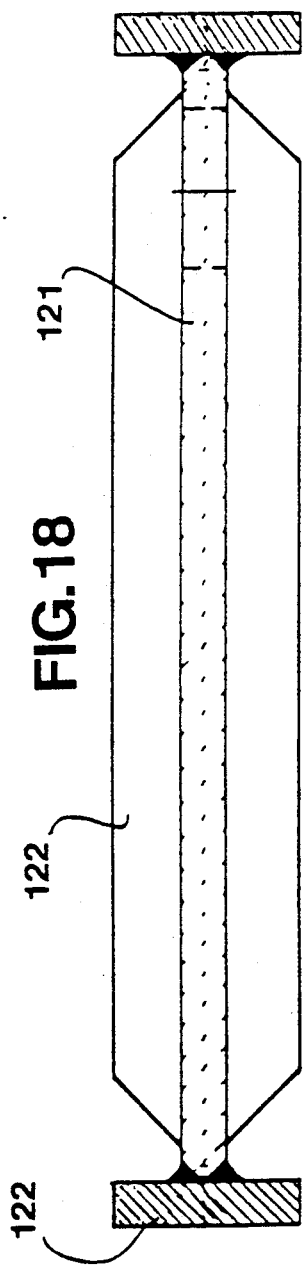
Figure 16:
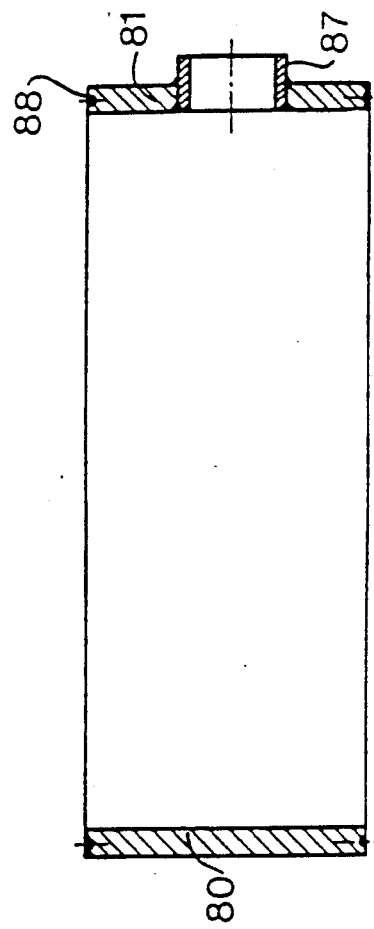
Figure 17:
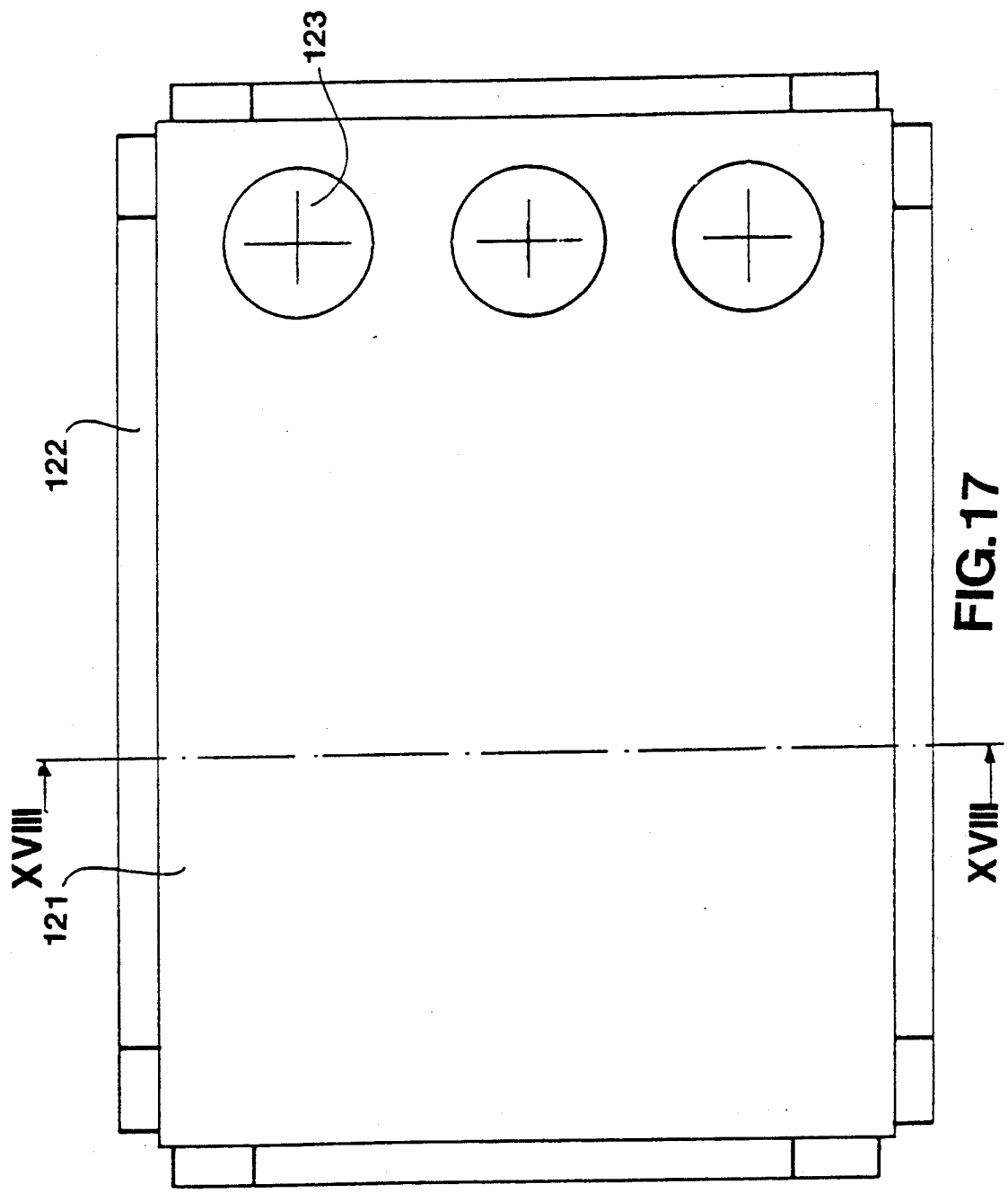

FIG. 4 is an exploded view of a filtration unit suitable for use in an apparatus according to the invention, FIGS. 5–7 illustrate steps in the making of a filtration unit by the method according to the invention, FIGS. 8–10 show examples of membrane units that may be used in carrying out the method according to the invention, FIG. 11 is an enlarged diagrammatic fragmentary section through a filtration unit built up from membrane units as in FIG. 10, FIG. 12 is a fragmentary section along the line XII—XII in FIG. 11, FIG. 13 is a perspective diagrammatic view of a corner of a filtration unit built up from membrane units as in FIG. 10 with a modification, FIG. 14 is a side view of a cassette frame (without filtration unit) for use in an apparatus according to the invention, FIG. 15 is a section along the line XV—XV in FIG. 14, FIG. 16 is a section along the line XVI—XVI in FIG. 14, FIG. 17 is a side view of a plate with reinforcement frame for use in an apparatus according to the invention, and FIG. 18 is a section along the line XVIII—XVIII in FIG. 17.

The apparatus shown in FIG. 1 comprises five cassette frames 1, 2, 3, 4 and 5, each containing a centrally arranged filtration unit 6 which only occupies part of the interior of the cassette frame so that free zones 7 and 8 are formed at opposite ends of each cassette frame. A cassette frame with a filtration unit arranged therein will in the following be referred to as a cassette. At the upper side of each cassette a discharge tube 9 for permeate is provided. The tube 9 communicates with a permeate collection chamber, which will be further described in the following. Between adjacent cassettes plates 10, 11, 12 and 13 are provided. Along the periphery of each plate a frame 14 is provided, which protrudes from both sides of the plate.

The plates 10 are supported on two rods 16, which are mounted in end plates 17 and 18, which are again mounted on a frame 19.

The end plates are connected by two additional rods 20. The rods 16, 20 are hollow and contain spindles 21, which are fastened in spindle fixtures 22 on the outer side of the end plate 18.

When the apparatus is assembled, the threaded ends of the spindles 21 are threadedly engaged in nuts 23 mounted on the outer side of the end plate 17. The nuts are connected with sprockets 24, and all four sprockets 24 can be driven synchronously by a motor, not shown.

As is apparent from FIG. 1. two of the cassette frames, viz. 1 and 5, are connected to a supply/discharge tube 25 for feed liquid and for concentrate, respectively. In the plates 10-13 flow passage openings 26 are provided alternately at one and the other side of the apparatus.

The apparatus illustrated in FIGS. 2 and 3 likewise comprises a frame 30, on which two pairs of hollow rods 31 and 32 are supported which are mounted in end plates 33 and 34. On the rods 31 and 32 an array of four cassette frames 35, 36, 37 and 38 are supported. Plates 39 are provided between each two cassette frames and in the region between the end plate 33 and the cassette frame 35 and between the cassette frame 38 and the end plate 34. Each plate 39 is constructed with an integrally connected reinforcement frame 40 which protrudes from both sides of the frame.

The cassette frames 35-38 are sealed against the plates 39 by means of O-rings. Each cassette frame contains a filtration unit 42 in the form of a stack of pairs of membranes and interposed spacing elements. At its ends the stack is enclosed between end plates 43, and at its underside by a bottom plate 44. At its top the filtration unit is provided with a permeate collecting chamber 45 with a permeate outlet 46.

In the interspaces between the outer side of the cassette frames and the portions of the reinforcement frames 40 overlapping the cassette frames, wedges 47 are provided at suitable intervals. The cassette frames are thereby protected against being deformed when subjected to high inner pressures.

Each of the hollow rods 31 and 32 contains a spindle 48, which is mounted in a spindle fixture 49 attached to the outer side of the end plate 34. At its opposite end the spindle is threaded and engages a nut 50 which is fastened to a sprocket 51. All four sprockets 51 are coupled by means of a chain, not shown, to a drive, not shown. By means of this drive the end plates can be moved towards or away from one another.

The filtration unit illustrated in FIG. 4 comprises a membrane stack 60 consisting of a multitude of membranes 61—e.g. in the order of 100 or more—arranged in pairs, a spacing element in the form of a net or web 63 being provided between the membranes of each pair 62 and serving to keep the membranes at a distance from one another such that the permeate can flow along the membranes towards a permeate collecting chamber to be described below. The pairs of membranes are spaced from one another by means of spacing elements in the form of nets or webs 64 that are coarser than the nets or webs 63. At the ends of the stack of membranes, end plates 65 are provided which at the underside of the stack 60 of membranes are interconnected by a bottom plate 66.

At the side faces of the stack 60 of membranes supporting ribs 67 are provided, the ends of which are fastened in slots 68 at the edges of the end plates.

The upper side of the filtration unit is constituted by a top plate 69, which together with downwardly extending side wall portions 69a and end wall portions 69b form a permeate collection chamber 70 on top of the stack 60 of membranes. In this chamber transverse supporting ribs 71 are provided in which arcuate incisions 72 are made at their top to permit permeate collected in the chamber 70 to flow towards a permeate outlet 73.

The filtration unit illustrated in FIG. 4 may advantageously be produced as follows: One end of each supporting rib 67 is inserted into the corresponding marginal slot 68 of one of the end plates 65 and is welded therein. Then the required number of pairs 62 of membranes with interposed spacing elements 63 are produced by placing a net or web 63 between the two membranes of each pair and closing each pair along three edges by means of an adhesive or by heat sealing. The pairs 62 of membranes thus produced are then stacked upon each other on the said end wall 65 with interposition of spacing elements 64 between the pairs. The other end plate 65 is now placed against the stack and connected with the supporting ribs 67 by introducing the free ends of the ribs into the marginal slots 68 of the plate and welding them therein. A moulding material or binder is now introduced into the interspaces between the pairs 62 of membranes from the top and bottom of the unit thus provided by placing the unit in inverted and upright position, respectively, in a moulding box which is partly filled with the moulding material, the moulding material also penetrating into the interstices of the spacing elements 64. The moulding material is introduced up to a distance of e.g. 40 mm from the top and bottom surface of the unit, respectively.

Upon curing of the moulding material the moulding box is removed, and when both the top and the bottom have been thus treated, the bottom plate 66 is welded in position between the two end plates 65.

The top of the unit thus produced is now subjected to a surface cutting or machining operation to remove material up to a depth which is substantially smaller than the above mentioned distance, e.g. 3 mm. Thereby a free passage is established to the flow passages between the two membranes of each pair 62 without establishing a communication with the flow passages formed by the spacing elements 64 between successive pairs 62 of membranes.

Finally, the permeate collecting chamber is formed by welding the top plate 69 with supporting ribs 71 and wall portions 69a and 69b to the unit.

FIGS. 5–7 illustrate the essential steps of the method of making a filtration unit according to the invention.

FIG. 5 is a diagrammatic fragmentary sectional view of pairs 62 of membranes placed in a stack. The spacing elements 63 and 64 of FIG. 4 are omitted in FIG. 5, because, as will be explained later, in some modes of carrying out the method the required spacing of the membranes may be obtained by means other than separate spacing elements.

FIG. 6 illustrates the introduction of a binder 101 into the interspaces between the membrane units constituted by the pairs 62 of membranes from the top surface of the stack up to a distance from the top surface. If spacing elements 64 are provided between the membrane units, the binder will penetrate into the interstices of the spacing elements. The dot-dash line 102 in FIG. 6 indicates the depth b to which material is removed, e.g., by a surface cutting or machining operation upon curing of the binder. The material removed comprises the binder, the marginal portions of the membrane units and the spacing elements 63 and 64, if any.

FIG. 7 illustrates the stack of membrane units in its final form. It will be seen that within each membrane unit a flow passage 103 is formed which at the top of the stack has a non-restricted opening 104 extending in the whole length of the membrane unit, so that the permeate collected within the membrane unit can flow out of this unit at a minimum of resistance. On the other hand, the whole top surface of the stack, including the free openings 104 of the membrane units, is sealingly separated from the concentrate flow passages 105 formed between the membrane units by the strings of binder 106 remaining between the membrane units.

In the embodiment described with reference to FIG. 4, binder is also introduced between the membrane units from the bottom of the stack, though not succeeded by removal of material. By this operation strings of binder will also be formed between the membrane units at the bottom of the stack, and besides the membrane units will be closed along their bottom edges, if they were not beforehand so closed. If the membrane units are already closed along all four edges before stacking, the processing steps at the bottom of the stack may be omitted, if desired, but may be useful for stabilizing the membrane units. On the other hand, the full succession of operating steps, including the removal of material, may in that case be repeated at the bottom of the stack, if it is desired to construct the filtration unit with an additional permeate outlet chamber at the bottom of the stack.

FIG. 8 shows a membrane unit, which is also composed of two membranes 107 and 108. Each membrane consists of a uniaxially profiled substrate, on which a membrane coating has been deposited, the profiled surfaces of the membranes being arranged face to face.

As is apparent from the detailed view in FIG. 8, the two membrane sides facing one another have a vertically extending profile structure so that a large number of narrow vertical flow passages 109 for permeate are formed. When building up a stack of membrane units of the type illustrated in FIG. 8, spacing elements 64 may advantageously be sandwiched between the membrane units, as in FIG. 4.

FIG. 9 shows two membranes 110 and 111 corresponding to the membranes 107 and 108 shown in FIG. 8. The membrane unit further comprises a rigid spacing element 112 arranged between the membranes 110 and 111, said element being provided on both sides with rib-like projections 113 extending perpendicularly to the profile structure of the opposed membrane sides.

As a consequence of the relatively high liquid pressure on the concentrate side, the membranes will, during operation, be forced into the indentations between the rib-like projections, thereby forming horizontal flow passages for the liquid to be treated, these passages extending perpendicularly to the flow passages on the permeate side.

Thus, with the membrane unit illustrated, flow passage systems are formed on both the permeate and the concentrate side.

A corresponding advantageous flow pattern can be obtained by using the membrane unit shown in FIG. 10, consisting of a membrane 114 having a profile structure corresponding to that mentioned with reference to FIG. 8, and another membrane 115 having a dual profile structure comprising finely profiled areas 116 separated by taller rib-like projections 117, which in the use of the membrane unit in a stack form horizontal flow passages 118 on the concentrate side, while the profiled structure of the membranes 114 forms vertical flow passages 119 on the permeate side, as illustrated in FIGS. 11 and 12. In these figures each membrane is illustrated in the form of a membrane coating 114 and 115, respectively, deposited on a substrate 114a and 115a consisting of knitted webs profiled as mentioned above.

The filtration unit illustrated in FIG. 13 is built up from membrane units as shown in FIG. 10, with the modification that the membrane units are tapered towards the lateral edges so as to form interspaces which at the corners of the filtration unit are filled with cured binder 120.

FIG. 13 also shows that the filtration unit has a great number of fine vertical flow passages 119 for permeate and, separated from these, a smaller number of horizontal flow passages 118 for liquid to be treated.

The cassette frame shown in FIGS. 14, 15 and 16, corresponding to parts 35–38 in FIG. 3, comprises four flat bars constituting the frame sides, viz. a bottom bar 80, a top bar 81 and two lateral bars 82, 83. The lateral bar 82 has an opening 84, through which the interior of the cassette frame communicates with a feed liquid supply/concentrate outlet pipe 85, in which a similar opening 86 is provided.

In the top bar 81, a permeate outlet tube 87 is provided.

In the edges of the lateral bars grooves 88 are provided for accommodating O-rings.

FIGS. 17 and 18 show a rectangular plate 121, corresponding to parts 39 in FIG. 3, which is provided at its periphery with an integral frame 122, which protrudes from both sides of the frame so as to partly overlap the adjacent cassette frames 80–83 when the array of cassettes and plates has been assembled. At the right-hand end of the plate a row of through holes 123 are provided, forming flow passages between the free zones of adjacent cassette frames.

When the plate 121 is used as end plate in the array of cassettes and plates, no holes are provided in the plate.

Depending on the desired flow pattern, the plate may be provided with holes at both ends instead of at one end only.

I claim:

1. A method of making a filtration unit comprising a stack of membranes, in which two discrete systems of flow passages are provided for conducting liquids along opposite surfaces of each membrane, viz. a first system for conducting feed liquid or concentrate, and a second system for conducting permeate, characterized by the steps of
(a) building up a stack of envelope-shaped membrane units (62; 107,108; 110,111; 114,115),
(b) introducing a curable liquid binder (101) between adjacent membrane units from the edges thereof in an area extending across the whole length and width of a surface of the stack up to a predetermined distance (a) from said surface,
(c) causing or leaving the binder thus introduced to cure, and
(d) removing the cured binder and the marginal portions of the membranes up to a depth (b) smaller than said predetermined distance.

2. A method as in claim 1, characterized by using membrane units (62; 107,108; 110,111; 114,115) having built-in integral or separate spacing elements.

3. A method as in claim 1 or 2, characterized in that in building up the stack, spacing elements (64) are sandwiched between the envelope-shaped membrane units.

4. A method as in claim 1 or 2, characterized by using membrane units (62; 107,108; 110,111; 114,115) with built-in spacing elements of a structure or configuration such as to form flow passages for permeate within each membrane unit.

5. A method as in claim 1 or 4 characterized by using membrane units (110,111; 114,115) with built-in spacing elements of a configuration to form flow passages between adjacent membrane units.

6. A method as in claim 1, characterized by using envelope-shaped membrane units produced by uniting two rectangular membrane sheets along their edges, such as by welding, heat sealing or glueing.

7. A method as in claim 1, characterized by using a binder consisting of a polyurethane.

8. A method as in claim 1, in which the removal of material is performed by a surface cutting or machining operation.

9. A method as in claim 1, characterized in that steps (b) and (c) are performed in two opposite surface areas of the stack.

10. A method as in claim 9, characterized in that also step (d) is performed in two opposite surface areas of the stack.

* * * * *